US 12,131,864 B2

(12) United States Patent
Rastogi et al.

(10) Patent No.: US 12,131,864 B2
(45) Date of Patent: Oct. 29, 2024

(54) TRANSFORMER WITH INTEGRAL INDUCTOR

(71) Applicant: DEERE & COMPANY, Moline, IL (US)

(72) Inventors: Sagar K. Rastogi, Raleigh, NC (US); Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 566 days.

(21) Appl. No.: 17/396,726

(22) Filed: Aug. 8, 2021

(65) Prior Publication Data

US 2022/0115180 A1    Apr. 14, 2022

Related U.S. Application Data

(60) Provisional application No. 63/198,281, filed on Oct. 8, 2020.

(51) Int. Cl.
*H01F 27/38* (2006.01)
*H01F 3/14* (2006.01)
(Continued)

(52) U.S. Cl.
CPC .............. *H01F 27/38* (2013.01); *H01F 3/14* (2013.01); *H01F 27/255* (2013.01); *H02M 3/33584* (2013.01)

(58) Field of Classification Search
CPC .......... H01F 27/38; H01F 3/14; H01F 27/255; H01F 3/12; H01F 27/40; H01F 38/08; H01F 2027/348; H02M 3/33584
See application file for complete search history.

(56) References Cited

U.S. PATENT DOCUMENTS

| 4,520,335 A | 5/1985 | Rauch et al. |
| 4,864,223 A | 9/1989 | Joder et al. |

(Continued)

FOREIGN PATENT DOCUMENTS

| CA | 1079823 | 6/1980 |
| EP | 1321950 B1 | 1/2013 |

(Continued)

OTHER PUBLICATIONS

Haksun Lee et al. "Design of Low-Profile Integrated Transformer and Inductor for Substrate-Embedding in 1-5kW Isolated GaN DC-DC Converters." 2017 IEEE 67th Electronic Components and Technology Conference (ECTC). IEEE, 2017. 2256-2262. Web.*

(Continued)

*Primary Examiner* — Malcolm Barnes
(74) *Attorney, Agent, or Firm* — Michael G. Monyok

(57) ABSTRACT

In accordance with one embodiment is a transformer with a core comprising a perimeter portion and central intervening portion. The central intervening portion is separated from the perimeter portion by air gaps, creating an opening on either side of the intervening portion. A primary winding and secondary winding are wound around the central intervening portion of the core. The primary winding is capable of electromagnetic interaction with the secondary winding. A pair of ferrite members arranged outward from a central axis of the central intervening portion of the core and increases a series inductance with the primary winding. In accordance with another aspect of the disclosure, each ferrite member may have an air gap associated with the core to facilitate heat dissipation from the transformer.

8 Claims, 7 Drawing Sheets

(51) Int. Cl.
*H01F 27/25* (2006.01)
*H01F 27/255* (2006.01)
*H02M 3/335* (2006.01)

(56) References Cited

U.S. PATENT DOCUMENTS

| | | | |
|---|---|---|---|
| 5,861,695 | A | 1/1999 | Brassard |
| 5,920,473 | A * | 7/1999 | Sturgeon ................. H02M 3/01 363/17 |
| 8,466,764 | B2 | 6/2013 | Bogert et al. |
| 10,734,848 | B2 * | 8/2020 | Degner .................... H01F 3/08 |
| 10,749,441 | B1 | 8/2020 | Singh et al. |
| 2006/0018134 | A1 | 1/2006 | Tsuruya |
| 2013/0120098 | A1 | 5/2013 | Chatani et al. |
| 2019/0304676 | A1 | 10/2019 | Koji et al. |
| 2020/0033931 | A1 * | 1/2020 | de Rochemont ......... H01F 3/14 |
| 2020/0168389 | A1 | 5/2020 | Zhang et al. |
| 2020/0234869 | A1 * | 7/2020 | Ishibashi ................ H01F 30/10 |

FOREIGN PATENT DOCUMENTS

| | | | |
|---|---|---|---|
| EP | 3425645 | A1 | 1/2019 |
| JP | H10223458 | A * | 2/1997 |
| KR | 20070074264 | A | 10/2007 |
| WO | 2020075996 | A1 | 4/2020 |

OTHER PUBLICATIONS

Heldwein, M. et al. "The three-phase common-mode inductor: Modeling and design issues." IEEE Transactions on Industrial Electronics 58, No. 8 (2010): 3264-3274.

Han, D. et al. "Three-phase common mode inductor design and size minimization." In 2016 IEEE Transportation Electrification Conference and Expo (ITEC), pp. 1-8. IEEE, 2016.

Sugimura. K. et al. "Surface-oxidized amorphous alloy powder/epoxy-resin composite bulk magnetic core and its application to megahertz switching LLC resonant converter." IEEE Transactions on Magnetics 53, No. 11 (2017): 1-6.

Kacki, M. et al. "A study of flux distribution and impedance in solid and laminar ferrite cores." In 2019 IEEE Applied Power Electronics Conference and Exposition (APEC), pp. 2681-2687. IEEE, 2019.

Fair-Rite Products Corp. "Use of Ferrites in Broadband Transformers" Technical Information Sheet pp. 1-4.

European Patent Office Search Report for Appl. No. 21190363.8 dated Feb. 11, 2022.

Lee, H. et al. "Design of Low-Profile Integrated Transformer and Inductor for Substrate-Embedding in 1-5kW Isolated GaN DC-DC Converters." In 2017 IEEE 67th Electronic Components and Technology Conference (ECTC), pp. 2256-2262. IEEE, 2017.

* cited by examiner

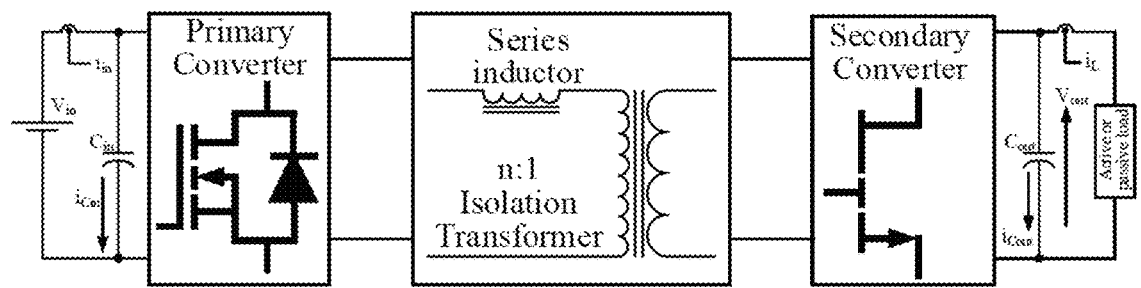
FIG. 1 (*Prior Art*)
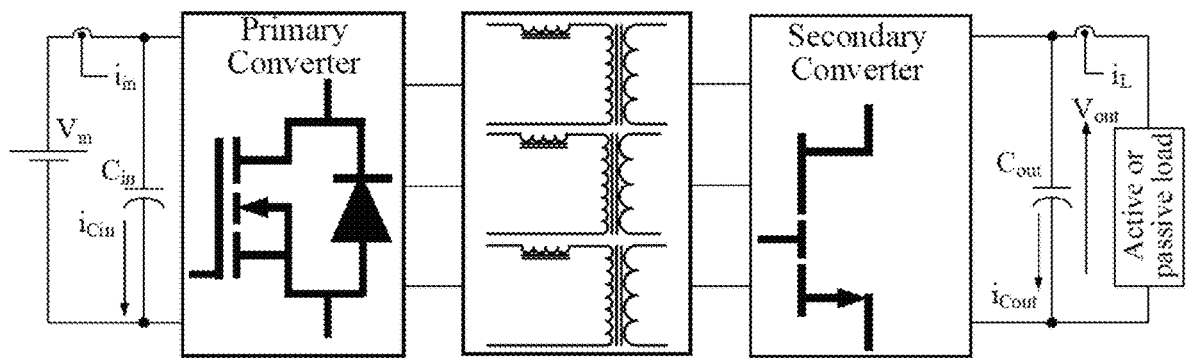
FIG. 2 (*Prior Art*)

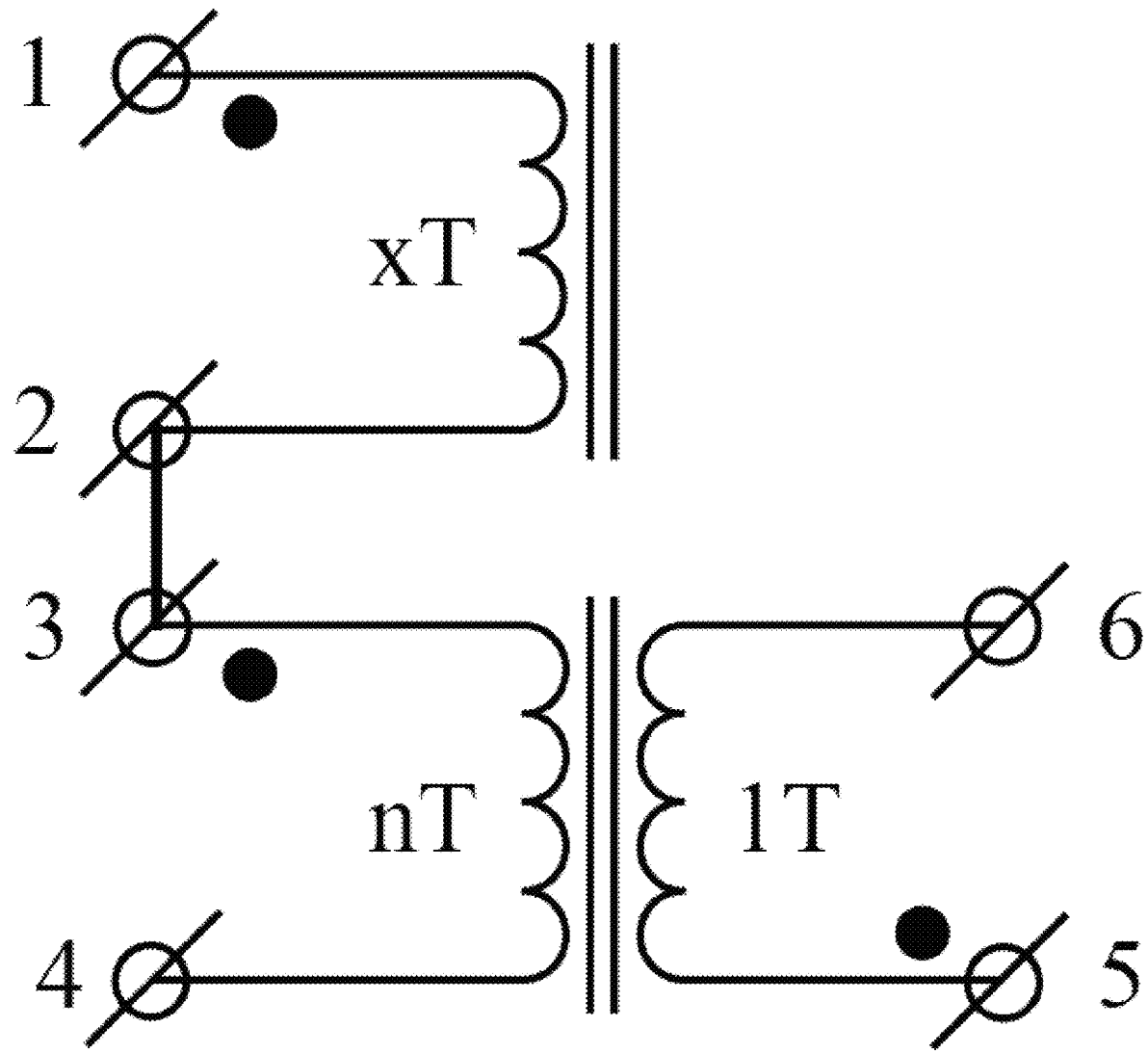
FIG. 3 (*Prior Art*)

TRANSFORMER WITH INTEGRAL INDUCTOR

CROSS-REFERENCE TO RELATED APPLICATIONS

This application claims the benefit under 35 U.S.C. § 119 of Provisional Application Ser. No. 63/198,281, filed Oct. 8, 2020, which is incorporated herein by reference.

STATEMENT REGARDING FEDERALLY SPONSORED RESEARCH

This invention was made with U.S. government support under contract or award No. DE-EE0006521 awarded by the Department of Energy. The Government has certain rights in the invention. The award subrecipient, John Deere Electronic Solutions, Inc. of the aforementioned contract or award, elects title to any and all subject inventions set forth in this disclosure for U.S. and any European patent filings.

BACKGROUND

The invention relates generally to an electrical transformer. More specifically, the invention relates to an isolation transformer with an integral inductor that can be used in a direct current (DC) to DC converter.

Touch-safe DC export power (24V to 56V) from a high-voltage bus (≥600V) can be realized using a dual active bridge (DAB)-based DC-to-DC converter. FIG. 1 depicts a typical single-phase DAB converter, which comprises a primary converter coupled to a secondary converter via a single-phase magnetic circuit, which includes an isolation transformer. For export power ≤5 kW, a single-phase DAB converter is often used, whereas a three-phase DAB converter (FIG. 2) can be used for power demands larger than 5 kW. For proper control of a DC-to-DC converter, a primary winding of the isolation transformer includes a series inductor. The magnetic circuit for this type of transformer is shown in FIG. 3.

The series inductor occupies 40% to 45% of the overall volume of the magnetic circuit. As the power density of DC-to-DC converters increases, the transformers can become bulkier, heavier, and costlier than desired to meet the design targets of an electronic assembly. Therefore, it would be advantageous to develop a transformer with an integral inductor to eliminate the series inductor, thereby improving its power density and reducing its size and cost.

BRIEF SUMMARY

According to one embodiment of the present invention is a transformer having a core comprised of a perimeter portion and central intervening portion. The perimeter portion is separated from the intervening portion by a first opening and a second opening. A primary winding and a secondary winding are wound around the intervening portion of the core. The primary winding is capable of electromagnetic interaction with the secondary winding. A pair of ferrite members arranged outwardly from a central axis of the central intervening portion of the core can increase a series inductance with the primary winding. In accordance with another aspect of the disclosure, each ferrite member may have an air gap next to the core to facilitate heat dissipation from the transformer or its integral inductor.

The integral inductor eliminates the series inductor by raising leakage inductance and keeping the leakage inductance within a tight bound over the range of power output for the converter. As a result, the miniaturized magnetics enables easier integration with the converter due to more compact packaging and better thermal management.

BRIEF DESCRIPTION OF THE SEVERAL VIEWS OF THE DRAWINGS

FIG. 1 is block diagram of a single-phase DC-to-DC converter as known in the prior art.

FIG. 2 is a block diagram of a three-phase DC-to-DC converter as known in the prior art.

FIG. 3 is a schematic of the electrical circuit of a transformer with a series inductor as known in the prior art.

DETAILED DESCRIPTION

Figure 4A:
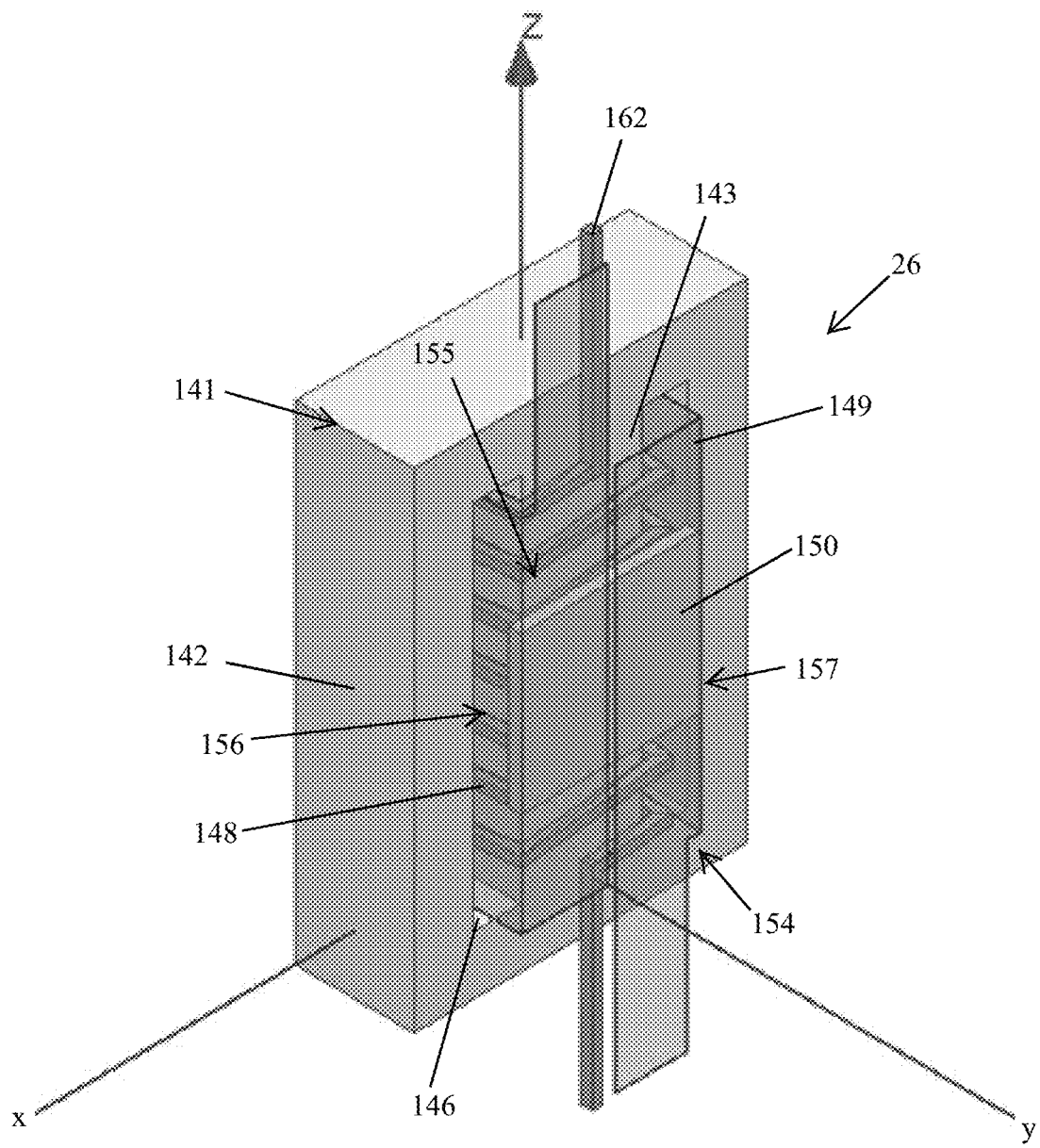
FIG. 4A is a perspective view of one embodiment of the transformer with an open form ferrite block aligned in a region between the primary winding and secondary winding.

In one example embodiment, as shown in FIG. 4A, is a transformer 26 with an integral inductor 152. The transformer 26 comprises a core 141, a primary winding 148, a secondary winding 149, and at least one ferrite member 150 disposed between the primary winding 148 and the secondary winding 149. Referring again to FIG. 4A, the core 141 has a perimeter portion 142 and a central intervening portion 143. Air gaps 146 separate the central intervening portion 143 from the perimeter portion 142. Further shown in FIG. 4A is the primary winding 148 and the secondary winding 149, which are wound around the central intervening portion 143 of the core 141, interior to the perimeter portion 142. Alternatively, the secondary winding 149 is wound about the perimeter portion 142 of the core 141.

The primary winding 148 is capable of electromagnetic interaction with the secondary winding 149. Additionally, the primary winding 148 may be capable of coupling an alternating current frequency (e.g., radio frequencies) with the secondary winding 149. In some alternate embodiments of transformer 26, windings 148/149 are placed on the central intervening portion 143 and the perimeter portions 142, particularly for a transformer 26 for a three-phase DC-to-DC converter 111. The core 141 comprises one or more of the following: a ferrous material, a laminated iron core, a powdered iron core matrix in a resin, or a ferrite material.

Figure 4B:
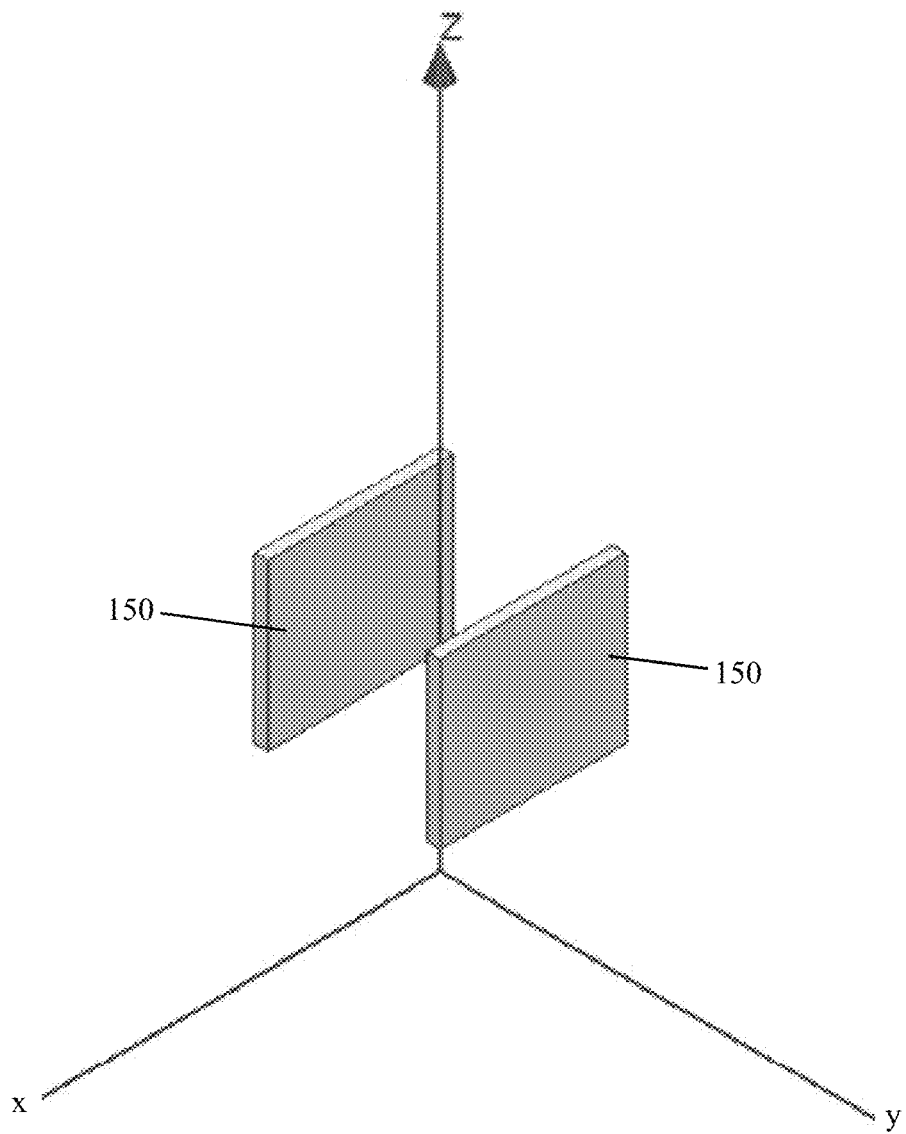
FIG. 4B shows the ferrite members in isolation from the transformer for illustrative purposes.

A pair of ferrite members 150 are arranged outward from a central axis of the central intervening portion 143 of the core 141 to increase a series inductance with the primary winding 148. As shown in FIG. 4A, a first ferrite member 150 is disposed on the front side of the intervening portion 143 and a second ferrite member 150 is disposed on the back of the intervening portion 143. Stated differently, the pair of ferrite members 150 are disposed on opposing sides of the core 141 relative to the central axis. In this configuration, the ferrite members 150 may concentrate or interact with the magnetic flux that emanates from the primary winding 148, the secondary winding 149, or both. Accordingly, the ferrite members 150 may attenuate or block DC energy paths, attenuate induced current (e.g., Eddy current) in the windings 148/149, or facilitate maintenance of a target inductance at a minimum threshold level, such as greater than or equal to 4 micro Henries (µH). Each ferrite member 150 can have a substantially rectangular shape, a generally polyhedron shape, or a block shape. In the example embodiment shown in FIG. 4A, each ferrite member 150 has a width along the X-axis, a height along the Z-axis, and a depth along the Y-axis, forming a plate-shaped member 150. FIG. 4B shows the ferrite members 150 in isolation from the additional components of the transformer 26 to show their position relative to each other. As shown in FIG. 4B, the pair of ferrite members 150 are substantially parallel and open.

In one embodiment, each of the ferrite members 150 has an air gap about its perimeter that can pass ambient air or flowing air with respect to one or more openings 146 in the core 141 to support or enhance heat dissipation from the transformer 26 or its integral inductor 152. For example, each ferrite member 150 can be centered with respect to the vertical dimension of the core 141 or with respect to the openings 146 in the core 141 along the Z-axis. In FIG. 4A, the height of the ferrite member 150 is generally less than or equal to the height of the core opening 146 to leave a perimeter air gap, such as a lower air gap 154 and an upper air gap 155, permitting dissipation of thermal energy from the transformer 26 or its integral inductor 152. In some embodiments, air communication means that the air can flow between the air gap 154/155 that is exposed to the ambient air and one or more openings 146 in the core 141.

Each ferrite member 150 can be centered with respect to the horizontal dimension of the core 141 or with respect to the outermost width of the openings 146 of the core 141 along the X-axis. As shown FIG. 4A, the width of the ferrite member 150 is generally less than or equal to the outermost portion of the core opening 146 width (in this example, the entire span of the two core openings 146 in FIG. 4A) to leave a perimeter air gap, such as a left-side air gap 156 and a right-side air gap 157, for dissipation of thermal energy from the transformer 26 or its integral inductor 152. The air gaps 156/157 allow the ambient air to circulate within the openings 146 and around the primary winding 148, the secondary winding 149, or both to promote heat dissipation from the transformer 26 and the integral inductor 152. In alternative embodiments, the ferrite members 150 may comprise closed form ferrite members 150 without material air gaps or ferrite members to surround, cage, or enmesh one or more windings 148/149 of the transformer 26.

Figure 9A:
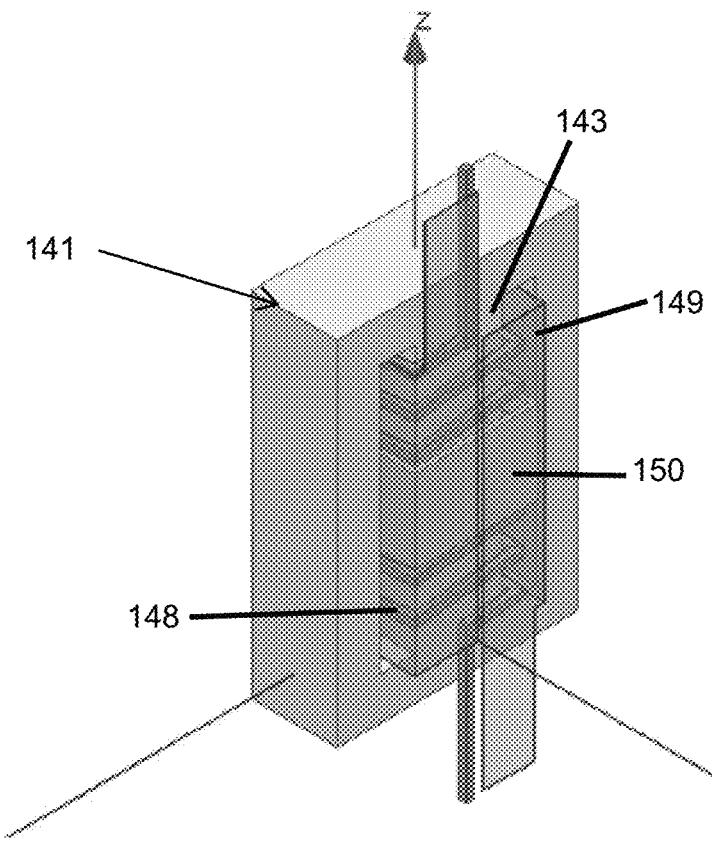
FIGS. 9A-9B show an alternative embodiment of the transformer with a closed form ferrite member.
Figure 9B:
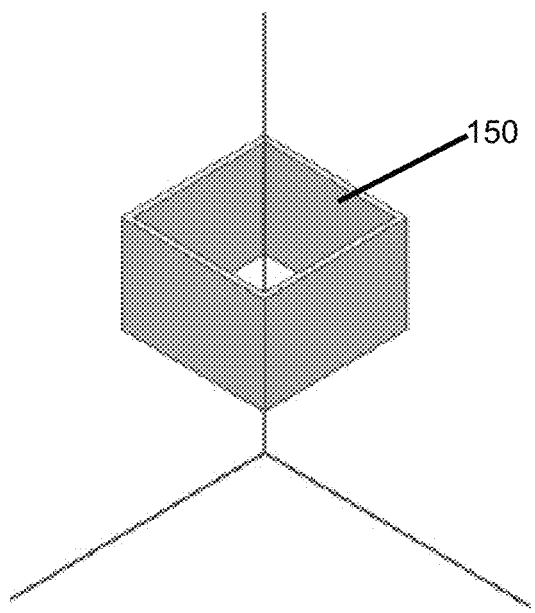

The ferrite member 150 may comprise a metal oxide, such as an oxide of iron, or other high-mu material to produce an isotropic (e.g., uniform properties along orthogonal axis or in different spatial dimensions) dielectric and magnetic material. Ferrite members 150 may be used to enclose the transformer 26, the primary winding 148, the secondary winding 149, or portions of transformer 26 and its windings. Alternatively, the ferrite members 150 may be composed of layers with different magnetic permeabilities. For example, the ferrite member may have a first layer composed of a lower permeability composition such as a nickel-zinc ferrite, whereas a second layer may be composed of a higher permeability composition such as a manganese-zinc ferrite composition. Further, each one of the ferrite members 150 may comprises a ferrite block or ferrite polyhedron In an alternative configuration of the transformer 26, the plurality of ferrite members 150 are U-shaped, C-shaped, box-portion-shaped, or substantially rectangular and can be connected to form a unified structure that is hollow to receive the central intervening portion 143, the primary winding 148, and the secondary winding 149, as shown in FIGS. 9A-9B. For example, the pair of ferrite members 150 may have facing edges that are configured with snap-fit connectors to mechanically and magnetically connect the ferrite members 150. Alternatively, the ferrite members 150 may be interconnected by mechanical fasteners, adhesives, elastomers, or bonding agents.

The transformer 26 disclosed herein can be used in power electronics, electronic assemblies, DC-to-DC converters 111, motor controls, power supplies, and other industrial applications. The series inductance of the integral inductor 152 of the transformer 26 supports power or energy transfer from the primary winding 148 to the secondary winding 149 of the transformer 26. In one example configuration of the transformer 26, the series inductance of an integral inductor 152 comprises a leakage inductance of equal to or greater than 4 µH.

The ferrite members 150 ensure that leakage inductance does not decline below a threshold, such as 4 µH, resulting in a simplified control method. Otherwise, high bandwidth control may not be possible due to passage of DC current that could saturate the inductor. Further, the transformer 26 offers better protection of power devices on the primary side of DAB-based DC-to-DC converters 111 because the inductance will ensure that the bandwidth of control systems and the protection circuit is sufficient to respond to abnormal operating conditions.

The transformer windings 148/149 can be configured to meet various design and technical requirements. For DC-to-DC converters 111 that feature a transformer 26, the primary winding 148 may comprise a first winding and a second winding that are coupled in series to a first winding a node. The first winding node represents the interface between the primary winding 148 and the integral inductor 152. In some configurations, the primary winding 148 can be interleaved with the secondary winding 149. The primary terminals 162 are associated with the primary winding 148. The secondary terminals 163 are associated with the secondary winding 149. The ratio of turns between the primary winding 148 and the secondary winding 149, or vice versa, is known and may be defined as N. The ratio of turns, N, may depend upon whether the transformer 26 is a step-up configuration for input/output voltages or a step-down configuration for input/output voltages, for instance.

The transformer 26 is adapted to be used with a DC-to-DC power converter 11/111 comprising a first power converter 12 coupled to the primary winding 148 and a second power converter 13 coupled to the secondary winding 149, wherein the series inductance supports power or energy transfer from the primary winding 148 to the secondary winding 149 of the transformer 26 (single-phase configuration) or transformers 26 (three-phase configuration).

Figure 5:
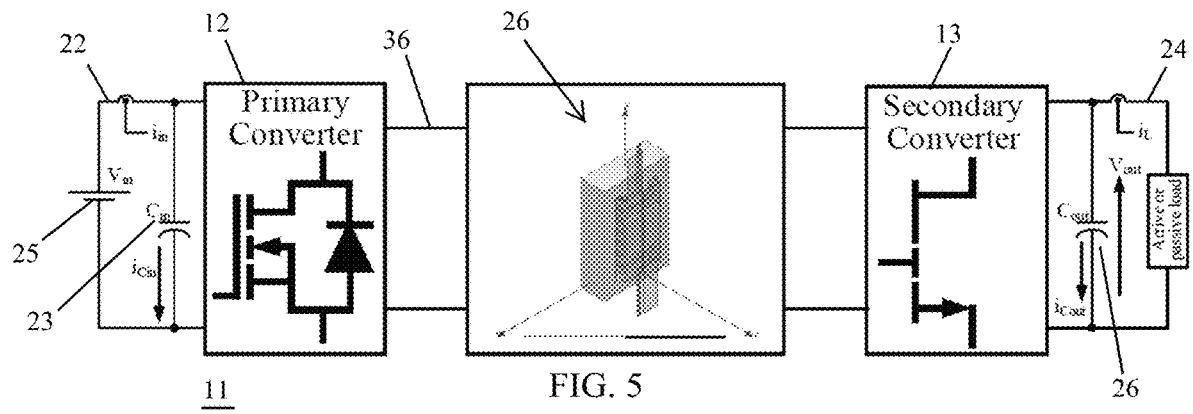
FIG. 5 shows one configuration of a transformed used with a single-phase DC-to-DC converter.
Figure 6A:
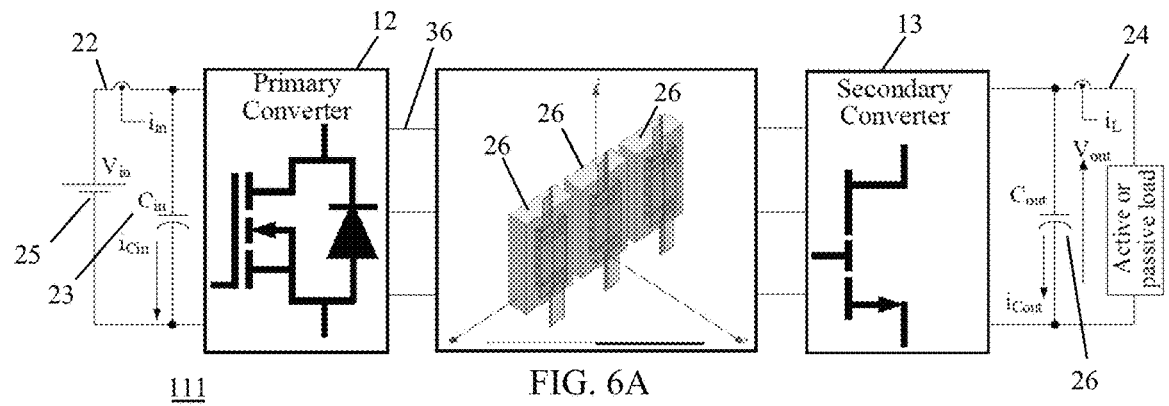
FIGS. 6A-6B show alternative configurations of transformers used with a three-phase DC-to-DC converter.
Figure 6B:
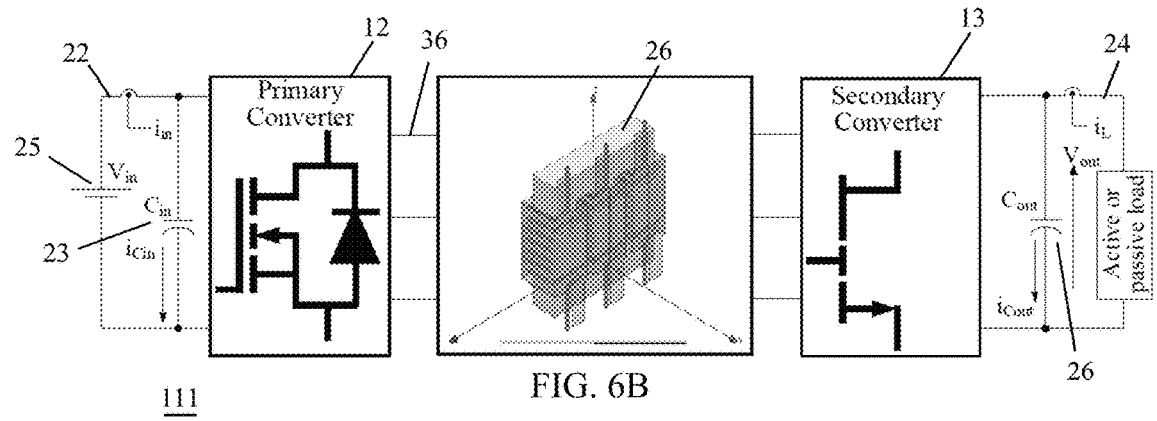

FIG. 5 shows a single-phase DAB-based DC-to-DC converter 11 with the transformer 26 disclosed herein. FIGS. 6A and 6B show two different configurations of a three-phase DAB-based DC-to-DC converter 111. As shown in FIG. 6A, three single-phase transformers 26 are shown. FIG. 6B shows a unified core 141 with three intervening sections 143.

Referring again to FIG. 5, the single-phase DAB-based DC-to-DC converter comprises a primary converter 12 coupled to a secondary converter 13 via the transformer 26. The primary converter 12 comprises first pair of primary switches and a second pair of primary switches. The primary switches are coupled between direct current terminals 22 of the primary converter 12. A primary capacitor 23 may be placed between the direct current terminals 22 to filter ripple current or unwanted alternating current components from the direct current bus. The primary direct current terminals 22 may be coupled to an energy source, such as a battery or another DC voltage source 25. The secondary converter 13 comprises secondary switches. The secondary switches are coupled between direct current terminals 24 of the secondary converter 13. A secondary capacitor 26 may be placed between the direct current terminals 24 to filter ripple current or unwanted alternating current components from the direct current bus. The secondary direct current terminals 24 may be coupled to an energy source, such as a battery or another DC voltage source 25.

An inductor 152 is associated with at least one output terminal 36 of the primary switches. There are two output terminals 36 for a single phase full-bridge converter 11. The inductor 152 may be integral with a primary winding 148 of the transformer 26 or may comprise a separate, discrete inductor 152. Multiple inductors 152 may be used in some embodiments. The primary winding 148 of the transformer 26 is coupled to output terminals 36 of the primary switches via the inductor 152. A secondary winding 149 of the transformer 26 is coupled to output terminal 36 of the secondary switches.

The DC-to-DC converters 111 shown in FIGS. 6A-6B are similar to the single-phase converters 11, but use three-phases for the primary converter 12 and the secondary converter 13.

A plurality of inductors 152 are associated with output terminals 36 of the primary switches. The inductors 152 may be integral with the primary winding 148 of each of the transformers 26 or may comprise separate, discrete inductors 152. Each transformer 26 is coupled between the primary converter 12 and the secondary converter 13. The primary winding 148 of the transformer 26 is coupled to output terminals 36 of the primary switches via the inductors 152. A secondary winding 149 of each transformer 26 is coupled to output terminals 36 of the secondary switches.

The unified body transformer 26 depicted in FIG. 6B has a volume of 1.5 L, as opposed to a volume of 2.2 L for the three separate transformers 26 shown in FIG. 6A. For the transformer 26 with a unified-body core 141, the flux density in the ferrite members 150 remains below 0.4 T. Further, the retention elevation of leakage inductance by the ferrite members 150 ensure that the effective turn ratio of the transformer 26 remains close to the turn ratio of an ideal transformer. Magnetizing inductance remains >10× of leakage inductance, ensuring that there is minimal distortion in current supplied by the primary converter 12 in single-phase and three-phase operation in DAB-based and resonant LLC mode. The ability to keep distortion to a minimal level will reduce on-loss in SiC power devices used in the primary converter 12. This characteristic can lead to improved converters 11/111 if the hardware is repurposed for an on-board battery charging application.

As previously discussed, the series inductor typically used with the primary winding 148 of the isolation transformer 26 adds to the size of the magnetic circuit. If the series inductor is simply removed, leakage inductance is not sufficient for proper control of DAB-based DC-to-DC converters 11/111. For example, an isolation transformer 26 without a series inductor may have a size of 93 mm×51 mm×138 mm (i.e. 0.65 L), but would have a leakage inductance of about 0.98 µH. To raise the inductance, a transformer without a series inductor would have to grow in size to 138 mm×95 mm×138 mm (i.e. 1.81 L), nearly triple the volume. Inserting the ferrite members 150 between the primary winding 148 and secondary winding 149 of the isolation transformer 26 permits a proper leakage inductance while minimizing the size of the magnetic circuit. As discussed, the ferrite members 150 can take various shapes and sizes. For a closed form / circuit ferrite member 150 the flux density across the XY, XZ, and YZ planes is above 0.4 T, which could lead to core loss in the ferrite member 150 and excessive flux density based on saturation of the ferrite member 150. Excessive heat can cause the ferrite member 150 to experience deviation in its magnetic permeability. As a result, it is desirable to keep the leakage inductance of the ferrite member 150 below 0.4 T. By using two ferrite members 150 disposed on opposing sides of the intervening central portion 143 of the core 141, the flux density in the XZ plain is absent as there is no magnetic material to divert or guide leakage flux between the primary winding 148 and secondary winding 149. This configuration eliminates saturation and overheating issues while maintaining a uniform field in the ferrite members 150 disposed in the XY plane.

Figure 7:
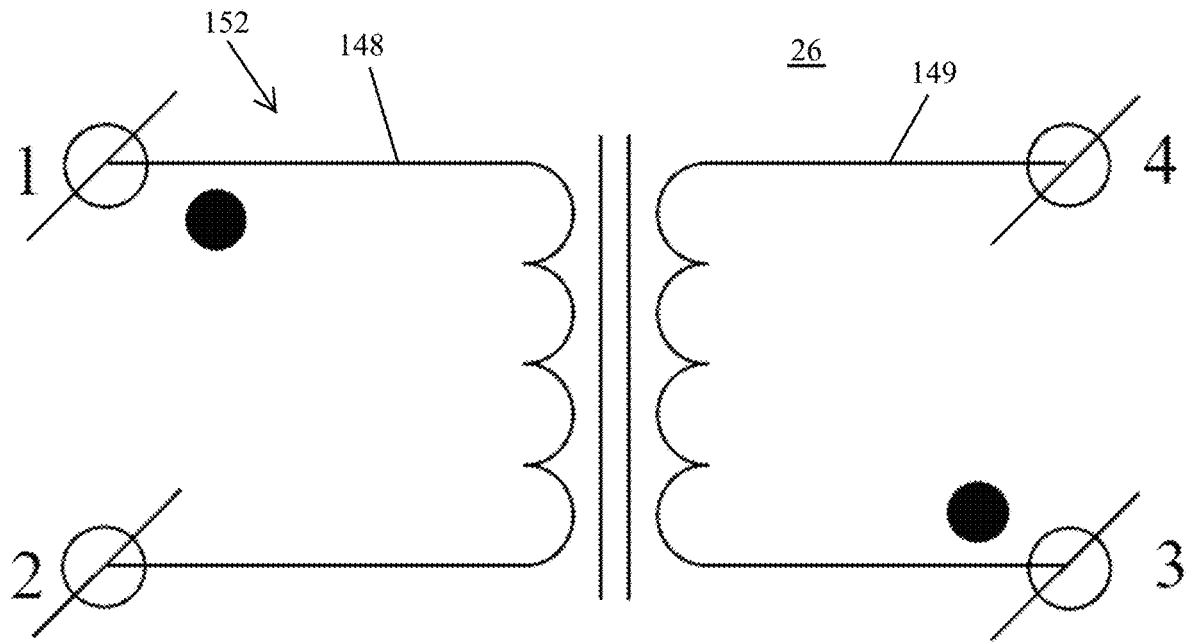
FIGS. 7-8 shows electrical diagrams for transformers used in single-phase (FIG. 7) and three-phase (FIG. 8) DAB-based DC-to-DC converters.
Figure 8:
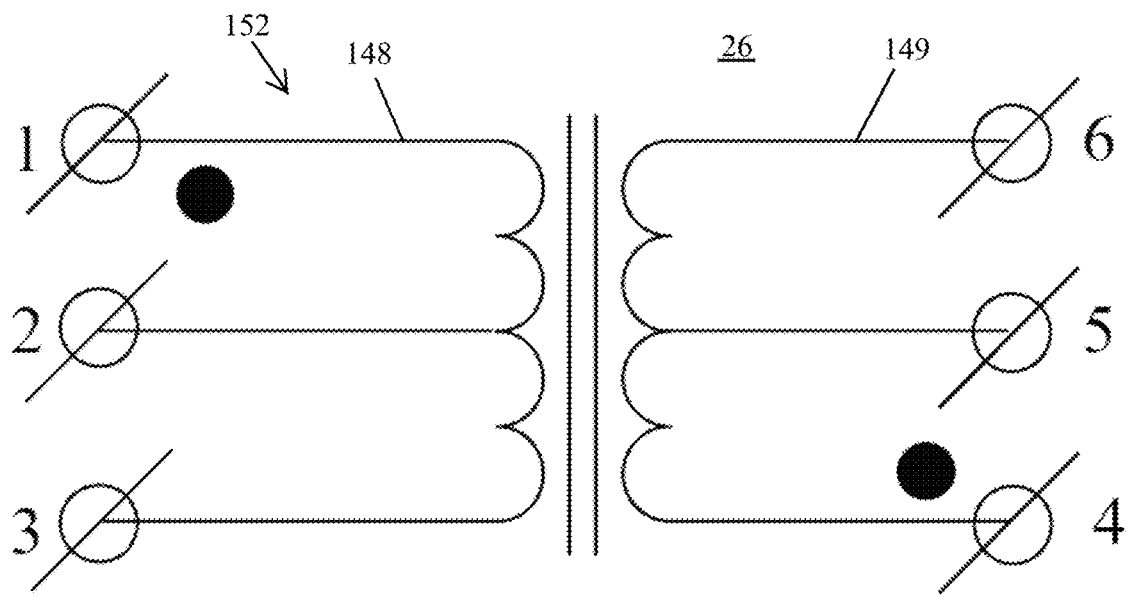

FIGS. 7-8 shows a simplified electrical diagram of the transformer 26 with taps in the primary 148 and secondary windings 149. If the primary winding 148 and secondary winding 149 are tapped, series and parallel operation of SiC and GaN-based power converters 11/111 becomes feasible, as these types of converters 11/111 may require the windings of the transformer 26 to operate at voltage and power values that differ from designed values.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

What is claimed is:

1. A transformer comprising:
   a core comprising a perimeter portion joined to a central intervening portion,
   wherein the perimeter portion has an open interior,
   wherein the central intervening portion is disposed in the open interior of the perimeter portion creating a first opening and a second opening in a space between the central intervening portion and the perimeter portion;
   a primary winding wound around the central intervening portion;
   a secondary winding wound around the central intervening portion,
   wherein the primary winding is capable of electromagnetic interaction with the secondary winding; and a pair of ferrite members disposed between the primary winding and the secondary winding and arranged on opposite sides of the core outward from a central axis of the central intervening portion of the core to increase a series inductance with the primary winding, wherein the pair of ferrite members comprise U-shaped members or substantially rectangular members joined to form a unified structure that is hollow to receive the central intervening portion.

2. The transformer according to claim 1, wherein the pair of ferrite members has an air gap around a perimeter of the pair of ferrite members with respect to the core.

3. The transformer according to claim 1 further comprising:

a DC-to-DC power converter comprising a first power converter coupled to the primary winding and a second power converter coupled to the secondary winding, wherein the series inductance supports power or energy transfer from the primary winding to the secondary winding of the transformer.

4. The transformer according to claim 1, wherein the series inductance comprises a leakage inductance of equal to or greater than 4 micro-Henries.

5. The transformer according to claim 1, wherein the core comprises at least one material selected from the group consisting of: a ferrous material, a laminated iron core, a powdered iron core matrix in a resin, and a ferrite material.

6. The transformer according to claim 1, wherein the pair of ferrite members comprises a ferrite block or ferrite polyhedron.

7. The transformer according to claim 1, wherein the pair of ferrite members are parallel.

8. The transformer according to claim 1, wherein the secondary winding is wound around the perimeter portion of the core.

\* \* \* \* \*